(No Model.)

T. J. BAKER.
TIRE SETTER.

No. 422,280. Patented Feb. 25, 1890.

WITNESSES:
F. L. Ourand
C. F. Chisholm

INVENTOR:
Thomas J. Baker
by Sands Jagger
Attorneys

N. PETERS, Photo-Lithographer, Washington, D. C.

UNITED STATES PATENT OFFICE.

THOMAS JEFFERSON BAKER, OF NEW CUMBERLAND, OHIO.

TIRE-SETTER.

SPECIFICATION forming part of Letters Patent No. 422,280, dated February 25, 1890.

Application filed August 17, 1889. Serial No. 321,060. (No model.)

*To all whom it may concern:*

Be it known that I, THOMAS JEFFERSON BAKER, a citizen of the United States, and a resident of New Cumberland, in the county of Tuscarawas and State of Ohio, have invented certain new and useful Improvements in Tire-Setters; and I do hereby declare that the following is a full, clear, and exact description of the invention, which will enable others skilled in the art to which it appertains to make and use the same.

My invention relates to improvements in tire-setters, and has for its object the provision of a simple, durable, and inexpensive device of the character mentioned, which will be thoroughly efficient for the purpose intended.

To attain the desired object the invention consists of the novel device illustrated, described, and specifically claimed herein.

Figure 1:
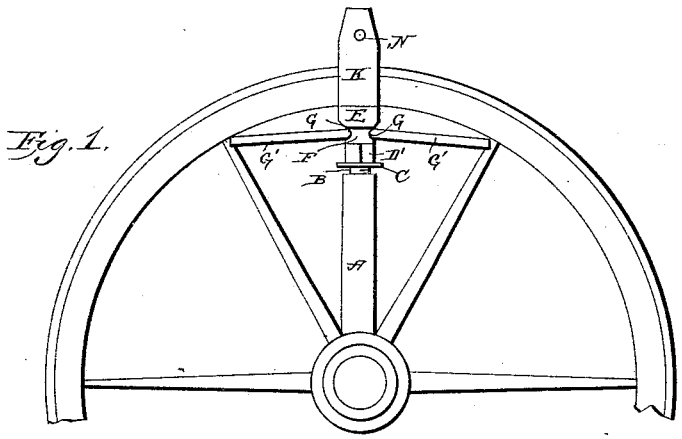
Figure 2:
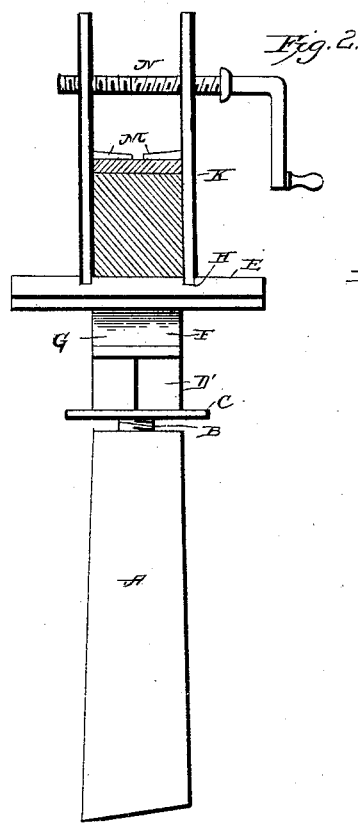
Figure 3:
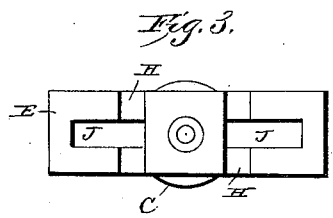
Figure 4:
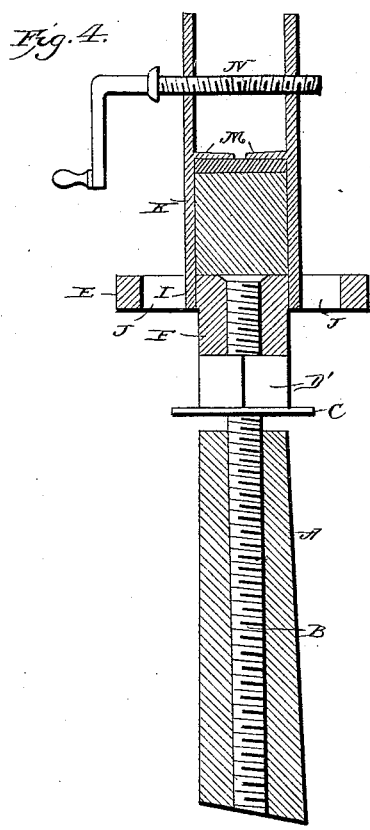

Figure 1 represents a side view of a portion of a wheel with my improved tire-setter applied thereto. Fig. 2 represents an end view thereof. Fig. 3 represents a plan view of the device. Fig. 4 represents a vertical sectional view thereof.

The device consists of the upright or stock A, the threaded stem B, the upper end adjustable in said stock, the washer C on said stem, the adjusting-nut D' on the threaded stem, the plate E, swiveled to the upper end of the stem, having the depending lug F, formed with the grooved sides G to receive the brace G', the transverse notches H, and longitudinal slots J. Fitting in the said slots and notches of the plate are the tire-setting plates K, which have their lower ends reduced at I to enter the slots, and are provided with inward extensions M, which engage the upper face of the tire.

In the upper ends of the plates K are openings which are engaged by the screw N, which adjusts the plates to set the tires. The threads in screw N are cut in opposite directions from the center toward the ends, and the apertures in plates K through which said screw passes must be correspondingly threaded. It will be understood that the plates K are capable of a lateral movement or adjustment in the slots I of plate E by means of the right and left handed screw N engaging with the similar screw-threads in the plates.

This being the construction of the device, the manner of using it is as follows: When it is desired to set or adjust the tire, the lower end of the upright rests upon the hub of the wheel, the upper end of the plate is pressed firmly against the under side of the felly by means of the adjusting-nut, and the setting-plates are adjusted by means of the screw to set the tire evenly on the felly, as will be readily understood from the drawings and description.

The braces G', it will be seen, brace the spokes while the operation of setting is being performed.

Having thus described my invention, what I claim, and desire to secure by Letters Patent of the United States, is—

1. In a tire-setter, the combination of the upright, the adjustable stem in said upright, the plate swiveled to said stem, the setting-plates engaging said plate, and the screw engaging the setting-plates, substantially as described.

2. In a tire-setter, the combination of the upright, the adjustable stem arranged in said upright, the plate swiveled to said stem, having the transverse grooves and longitudinal slots, the plates having their lower ends fitting in the slots and grooves, the extensions on said plates, and the screws engaging the plates, substantially as described.

3. In a tire-setter, the combination, with the wheel, of the upright, the stem adjustable in said upright, the plate having the transverse grooves and longitudinal slots, and the depending lug having grooves in its sides, the braces engaging the latter grooves, and the spokes of the wheel, the setting-plate fitting in the slots and grooves of the first-named plate, and the set-screw, substantially as described.

In testimony that I claim the foregoing as my own I have hereunto affixed my signature in presence of two witnesses.

THOMAS JEFFERSON BAKER.

Witnesses:
DANIEL L. DAVY,
AARON RANDAL.